US009265261B2

(12) United States Patent
Haas et al.

(10) Patent No.: US 9,265,261 B2
(45) Date of Patent: Feb. 23, 2016

(54) OVEN TRANSFER APPARATUS WITH LATERALLY DISPLACEABLE CONVEYOR BELT

(71) Applicant: HAAS FOOD EQUIPMENT GMBH, Vienna (AT)

(72) Inventors: Johannes Haas, Vienna (AT); Josef Haas, Leobendorf (AT); Stefan Jiraschek, Koenigsbrunn (AT); Peter Lambauer, Hitzendorf (AT)

(73) Assignee: Haas Food Equipment GmbH, Vienna (AT)

( * ) Notice: Subject to any disclaimer, the term of this patent is extended or adjusted under 35 U.S.C. 154(b) by 0 days.

(21) Appl. No.: 14/406,282

(22) PCT Filed: May 27, 2013

(86) PCT No.: PCT/EP2013/060858
§ 371 (c)(1),
(2) Date: Dec. 8, 2014

(87) PCT Pub. No.: WO2013/182445
PCT Pub. Date: Dec. 12, 2013

(65) Prior Publication Data
US 2015/0114800 A1    Apr. 30, 2015

(30) Foreign Application Priority Data
Jun. 8, 2012   (AT) .................... A 658/2012

(51) Int. Cl.
B65G 47/08    (2006.01)
B65G 47/22    (2006.01)
(Continued)

(52) U.S. Cl.
CPC . *A21C 9/08* (2013.01); *B65G 15/64* (2013.01); *B65G 39/16* (2013.01); *B65G 43/00* (2013.01); *B65G 2201/0202* (2013.01)

(58) Field of Classification Search
CPC .......................... B65G 47/647; B65G 47/648
USPC ....... 198/369.5, 456, 586, 587, 597
See application file for complete search history.

(56) References Cited

U.S. PATENT DOCUMENTS 3,982,625 A  *  9/1976  Wentz ............... B65G 47/50
                                                    198/357
4,244,461 A  *  1/1981  Fischer ............... B65H 5/021
                                                    198/456

(Continued)

FOREIGN PATENT DOCUMENTS

DE    364301 C1    8/1923
GB    472270 A     9/1937
GB    657605 A     9/1951

Primary Examiner — Douglas Hess
(74) Attorney, Agent, or Firm — Laurence A. Greenberg; Werner H. Stemer; Ralph E. Locher

(57) ABSTRACT

A method and an apparatus are provided for transporting shaped bodies such as, for example, substantially non-rigid, biscuit dough shaped bodies, from a receiving region into a transfer region, and for transferring the shaped bodies onto a transport surface such as, for example, a heated baking belt of a baking machine. The apparatus for transporting the shaped bodies includes a revolving driven conveyor belt which is guided over at least one deflecting roller, over a drive roller and around a transfer body in the region of the transport surface. The conveyor belt is laterally displaceable by a positioning apparatus at least over a section of its longitudinal extension.

25 Claims, 6 Drawing Sheets

(51) Int. Cl.
   *A21C 9/08*   (2006.01)
   *B65G 39/16*  (2006.01)
   *B65G 15/64*  (2006.01)
   *B65G 43/00*  (2006.01)

(56) References Cited

U.S. PATENT DOCUMENTS

| | | | | |
|---|---|---|---|---|
| 4,828,102 A * | 5/1989 | Dotson | ............... | B65G 15/22 198/588 |
| 5,188,210 A * | 2/1993 | Malow | ............... | B65G 21/2054 198/369.5 |
| 5,383,760 A * | 1/1995 | Cawley | ............... | B65G 47/2445 198/415 |
| 5,634,545 A * | 6/1997 | Plumley | ............... | B65G 37/00 198/303 |
| 6,152,284 A * | 11/2000 | Sandberg | ............... | B65G 47/52 198/432 |
| 6,155,400 A * | 12/2000 | Daigh | ............... | B65G 41/008 198/301 |
| 7,658,274 B2 * | 2/2010 | Mignano | ............... | B65G 47/71 198/353 |
| 8,636,137 B2 * | 1/2014 | Weber | ............... | B65G 47/24 198/456 |
| 8,733,534 B2 * | 5/2014 | Lim | ............... | B65G 47/648 198/369.5 |
| 8,955,664 B2 * | 2/2015 | Lim | ............... | B65G 47/644 198/369.5 |
| 2005/0061162 A1 | 3/2005 | Miller et al. | | |
| 2011/0147163 A1 | 6/2011 | Alleman et al. | | |

* cited by examiner

OVEN TRANSFER APPARATUS WITH LATERALLY DISPLACEABLE CONVEYOR BELT

BACKGROUND OF THE INVENTION

Field of the Invention

The invention relates to a method and an apparatus for transporting shaped bodies from a receiving region into a transfer region, and for transferring onto a transport surface such as, for example, a heated baking belt of a baking machine, wherein the apparatus for transporting the shaped body comprises a revolving driven conveyor belt which is guided over at least one deflecting roller, a drive roller and in the region of the transport surface around a transfer body.

The field of the invention relates to apparatuses for transferring shaped bodies such as unbaked flat dough cakes, unbaked biscuit shaped bodies, unbaked dough pieces etc. and in particular oven transfer belts for transferring flat unbaked, biscuit dough, shaped pieces onto the hot baking belt of a baking machine. In order not to damage the shaped bodies during the transfer, the shaped bodies must be transferred as gently as possible from the transfer belt onto the baking belt. To this end the transfer belt is guided as close as possible to the baking belt.

The transport surface onto which the substantially non-rigid biscuit shaped bodies are transferred is not disposed in a fixed position according to the prior art but experiences a certain movement. In the case of baking belts of a baking machine, on the one hand the continued movement of the conveyor belt in the transport direction is given. In addition, however, the baking belt has a lateral movement component transverse to the transport direction of the baking belt which is caused by a mounting of the baking belt with backlash. A rigid lateral guidance of the belt is not possible since this guidance leads to increased wear or to damage to the baking belt.

Accordingly, the conveyor belt of the oven transfer apparatus must be tracked and/or adapted to the lateral movement of the oven belt.

An apparatus according to the prior art for example has a machine frame which can be turned with respect to the baking machine about a pivot point. The transfer region of the oven transfer apparatus can thus also be moved about this pivot point in order to compensate for the lateral movement of the baking belt. A disadvantage with this construction is that the oven transfer apparatus and the transfer region of the oven transfer apparatus must be moved with respect to the transport surface of the baking machine. However, this movement differs from the purely lateral movement of the baking belt of the baking machine. This results in a variation of the transfer gap depending on the position and situation of the two apparatuses. Particularly in the case of thin, small and/or non-rigid biscuit shaped bodies, this can result in damage during the transfer.

A further disadvantage of this design is that the belts of the transfer apparatuses are designed as plastic belts. These are not sufficiently heat-resistant to be guided without damage close to the baking belt of the baking machine. This shortcoming also results in a larger transfer gap and therefore a poorer-quality transfer.

BRIEF SUMMARY OF THE INVENTION

It is now the object of the invention to overcome these disadvantages of the prior art and thereby provide an apparatus which allows a high-quality transfer of shaped bodies onto a transport surface. This comprises the sub-objects that the transfer gap is kept as small as possible, that the transfer radius is optimised, that the positioning of the transfer region of the apparatus is adapted to the lateral movement of the transport surface of the baking machine and that at the same time, the transfer gap is kept substantially constant.

Furthermore, it is the object of the invention to enable high-quality transfer of substantially non-rigid shaped bodies onto a hot baking surface of a baking machine.

Furthermore, this also comprises the objects that the construction of the apparatus is optimised for maintenance and favourable in manufacture.

The object according to the invention is solved whereby the conveyor belt is laterally displaceable by means of a positioning apparatus at least over a section of its longitudinal extension.

Further features according to the invention are that the conveyor belt is laterally displaceable in sections by means of a positioning apparatus, that the transport direction and the lateral position of the conveyor belt is kept constant in the receiving region during the lateral displacement of the conveyor belt, that the conveyor belt is laterally displaceable in the transfer region, that the conveyor belt is laterally displaceable in the transfer region by means of the positioning device along a transfer contour following the transfer body, that the positioning apparatus comprises at least one positioning means for guiding the conveyor belt and/or that the positioning means is movable by means of an actuator.

The invention is further characterised in that the positioning means is coupled to the transfer body and that the transfer body can be moved transversely to the transport direction by means of the actuation of the actuator, that two positioning means are provided for the lateral guidance of the conveyor belt, that the actuator comprises a mechanical or an electromechanical actuator such as, for example, an electrically driven linear axis, a pneumatically driven linear axis, a hydraulically driven linear axis or a crank assembly, that a detection apparatus is provided for detection of the lateral position of the transport surface, by which means the lateral displacement and/or positioning of the conveyor belt is made possible as a function of the lateral position of the transport surface and/or that the detection apparatus comprises a mechanical or electromechanical detection means such as, for example, a position sensor, an optical sensor, a microswitch, a reed sensor or a mechanically movable roll.

According to the invention, it can be further provided that the transfer body is designed as a transfer blade, preferably as a transfer blade having a sharp transfer contour, that the drive roller is disposed in the transport direction downstream of the receiving region and upstream of the transfer contour, that the deflecting roller, the drive roller and the transfer body are disposed or mounted in a machine frame disposed rigidly with respect to the machine, and/or that the drive roller is coupled laterally rigidly to the machine frame and that the positioning means and/or the transfer body is movable laterally with respect to the machine frame.

Furthermore, features can be that the transport direction in the receiving region differs in the event of lateral displacement from the transport direction in the transfer region, that the axes of the deflecting rollers, the drive roller and the transfer contour run substantially parallel to one another, that the conveyor belt is designed as a discontinuous belt, in particular as a discontinuous metal belt, preferably as a spiral link belt and that the conveyor belt is substantially resistance strain-relieved in the run-in region of the transfer contour. In particular, the use of a discontinuous metal belt such as, for example, a spiral link belt is advantageous if the shaped bodies are transferred to a hot transport surface such as, for example, the baking belt of a baking machine. The discontinuous belt is characterised in that it is heat-resistant and can be guided close to the baking belt of the baking machine. This improves the quality of the transfer.

This invention is further optionally characterised in that the conveyor belt has the lowest tensile stress in the run-in region of the transfer contour or in the region between the drive roll and the transfer contour and/or that the conveyor belt has a substantially constant basic stress and a resistance stress produced by friction and that in the run-in region of the transfer contour or in the region between the drive roll and the transfer contour, the transport belt is substantially free from resistance stress or that only the basic stress acts in this region.

The invention further relates to a method characterised by the following steps: the shaped body is conveyed on a revolving driven conveyor belt from a receiving region into a transfer region; a detection apparatus detects the lateral position of the transport surface; the conveyor belt is displaced laterally as a function of the lateral position of the transport surface in the transfer region; the shaped body is transferred onto the transport surface via a transfer contour and a transfer gap.

The method according to the invention can also comprise the steps that the conveyor belt is tracked to the lateral position of the transport surface by a lateral displacement in the transfer region and/or that the lateral position and the transport direction of the conveyor belt are kept constant in the receiving region.

Furthermore, the invention relates to a biscuit baking oven which is characterized in that an apparatus according to the invention is provided.

According to the invention, the apparatus comprises a positioning apparatus by which means the conveyor belt can be positioned at least in the transfer region as a function of the lateral position of the transport surface. To this end a detection apparatus is provided which detects the lateral position of the transport surface. Lateral is designated in this case as that direction which runs substantially transverse to the transport direction or the transport surface. In the transfer region the conveyor belt is guided around a transfer body. In this region, in particular in that region in which the transported moulded bodies at least partially leave the conveyor belt, a transfer contour is formed. The transfer contour substantially follows the transfer body and/or the conveyor belt in the region of the transfer body. The transfer contour is a flat or linear contour in that region of the conveyor belt in which the shaped body leaves the conveyor belt. The deflection of the conveyor belt at the transfer body is preferably designed in such a manner that the conveyor belt is deflected around an approximately horizontally running transfer contour in the direction of gravity. The angle of deflection in this case is at least 90°, preferably 90° to 180°. The angle of deflection is preferably measured in a perpendicular plane running in the transport direction. Located between the transport surface of the machine and the transfer contour is the transfer gap. This is optimised in its shape and size and is preferably kept constant during lateral positioning or displacement of the conveyor belt. To keep the transfer gap constant, the conveyor belt is moved or displaced in the transfer region along the transfer contour.

Furthermore, the apparatus according to the invention has a receiving region for receiving the shaped body. This is preferably disposed in a region of the conveyor belt which has a certain distance from the transfer region. This means that during lateral displacement of the conveyor belt in the transfer region the conveyor belt experiences no lateral displacement in the receiving region.

For this purpose conveyor belts are used which are laterally displaceable and in particular which allow a parallel displacement. During a parallel displacement the conveyor belt can be displaced laterally in certain sections. This displacement takes place almost exclusively in the area formed by the conveyor belt. In this case, no bulging or twisting of the conveyor belt occurs. This assumes that the conveyor belt has a lateral flexibility. For example, discontinuous metal belts such as, for example, spiral link belts are suitable for use in the apparatus according to the invention. These comprise transverse elements which run substantially normally or transversely to the transport direction. The transverse elements are connected to one another by spiral elements in chain form and can be displaced laterally relative to one another. In particular, the transverse elements can be displaced parallel to one another and are connected to one another by the spiral elements.

The apparatus according to the invention is preferably used "inline" in a line for the industrial production of baked goods. In particular, the apparatus is adapted for this purpose to convey substantially non-rigid shaped bodies such as, for example, unbaked biscuit shaped bodies from, for example, a cutting apparatus to form, for example, round biscuits to a transport surface, for example the oven belt of a biscuit baking oven. This further means that the control unit of the drive and the actuators of the apparatus is optionally connected to the control unit of a baking machine or of an entire production line. Otherwise, an independent control unit of the apparatus can be provided by which means the drive of the conveyor belt, the lateral displacement of the conveyor belt and/or further parameters can be controlled.

In this connection it is defined that the actuator substantially corresponds to a component which can execute a controlled and/or regulated movement. Examples for actuators are pneumatic drives such as pneumatic cylinders, hydraulic drives such as, for example, hydraulic pistons or hydraulic cylinders, electric drives, linear axes etc.

A body which has a low bending strength—for example, raw biscuit bodies, dough pieces etc. is defined as a substantially non-rigid shaped body. As a result of the lack of stiffness, this body can only be transferred via gaps of low gap width since otherwise damage to the shaped body would take place.

The invention is described further subsequently with reference to specific embodiments and figures.

DESCRIPTION OF THE INVENTION

Figure 1:
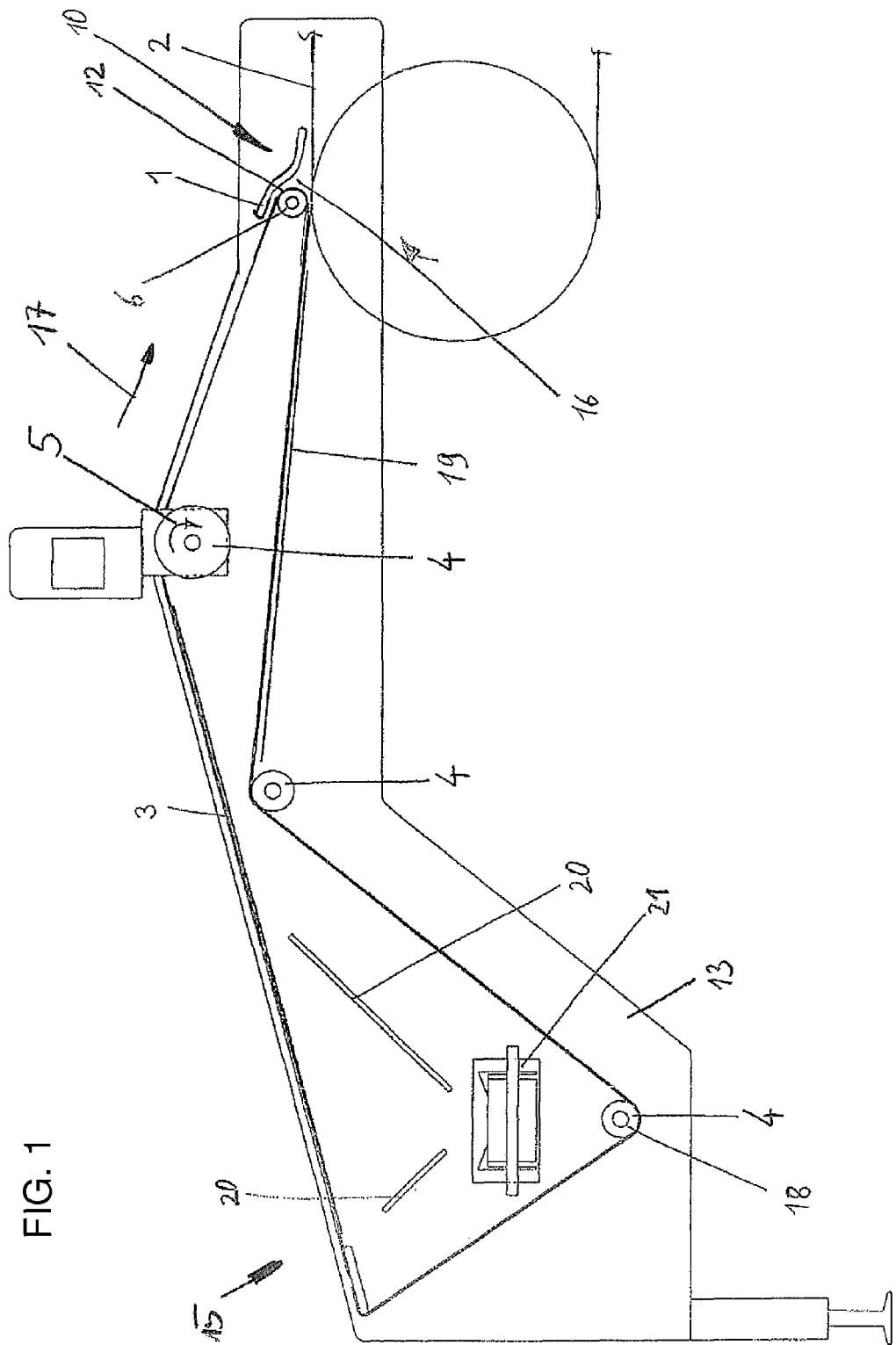
FIG. 1 shows a schematic side view of an apparatus according to the invention.

FIG. 1 shows a schematic side view of an apparatus according to the invention for transferring one or more shaped bodies 1 from a conveyor belt 3 onto a transport surface 2. The conveyor belt 3 is in this case guided around one or more deflecting rollers 4 and around a transfer body 6. Furthermore a drive roller 5 is provided in the course of the conveyor belt 3. This can be designed as deflecting roller 4 or as non-deflecting drive roller. Furthermore, one of the deflecting rollers 4 can be designed as tensioning roller 18. In the present embodiment the transfer body 6 is designed as a cylindrical body. This can be coupled rotationally rigidly to the machine frame 13 or be mounted rotatably on the machine frame 13 similarly to a deflecting roller 4. In the transfer region 10 in which the shaped bodies 1 can be transferred from the conveyor belt 3 onto the transport surface 2 of a machine 7, a transfer gap 16 and a transfer contour 12 are defined. The transfer gap 16 substantially corresponds to the gap between the conveyor belt 3 and the transport surface 2 in the transfer region 10. The transfer contour is a flat or linear contour in that region of the conveyor belt in which the shaped body 1 leaves the conveyor belt 3.

In the present embodiment the drive roller 5 is disposed in the region upstream of the transfer region in the transport direction 17. With the cylindrical design of the transfer body 6, however, it also corresponds to the inventive idea to design another deflecting roller of the apparatus as drive roller 5. The feeding region 15 is provided in a region of the apparatus facing away from the transfer body. In this region the shaped bodies are fed onto the conveyor belt 3. In the case of an apparatus for the industrial production of biscuits, for example, non-rigid unbaked biscuit dough pieces coming from a cutting apparatus are transferred onto the conveyor belt 3. The cutting apparatus and the means for transfer to the apparatus according to the invention are usually disposed in a fixed position. For this reason according to the invention the conveyor belt 3 is preferably also disposed in a fixed position in the receiving region 15. This means that the conveyor belt according to this embodiment and preferably according to the invention has no lateral freedom of movement or remains laterally unmoved. However, the movement of the conveyor belt 3 in the transport direction 17 is given by the arrangement of deflecting rollers 4 according to the invention. A displacement of the conveyor belt 3 is required for adaptation of the conveyor belt 3 to the lateral movement of the transport surface 2. The displacement is preferably achieved by means of a parallel displacement. In the present view a parallel displacement means that a partial displacement of the conveyor belt 3 takes place in a direction which runs projecting in the present view.

For supporting the conveyor belt 3, in particular for support against any sagging as a result of gravity, one or several guide means 19 are provided below the conveyor belt. These guide means can, for example, be designed as strip-shaped guide means following the course of the conveyor belt 3. The conveyor belt 3 rests substantially on these guide means 19 and is moved along these during movement. Furthermore, the apparatus can comprise a funnel apparatus 20 and a collector 21. The funnel apparatus is used, for example to feed impurities or excess spreading material in the collector 21.

Figure 2:
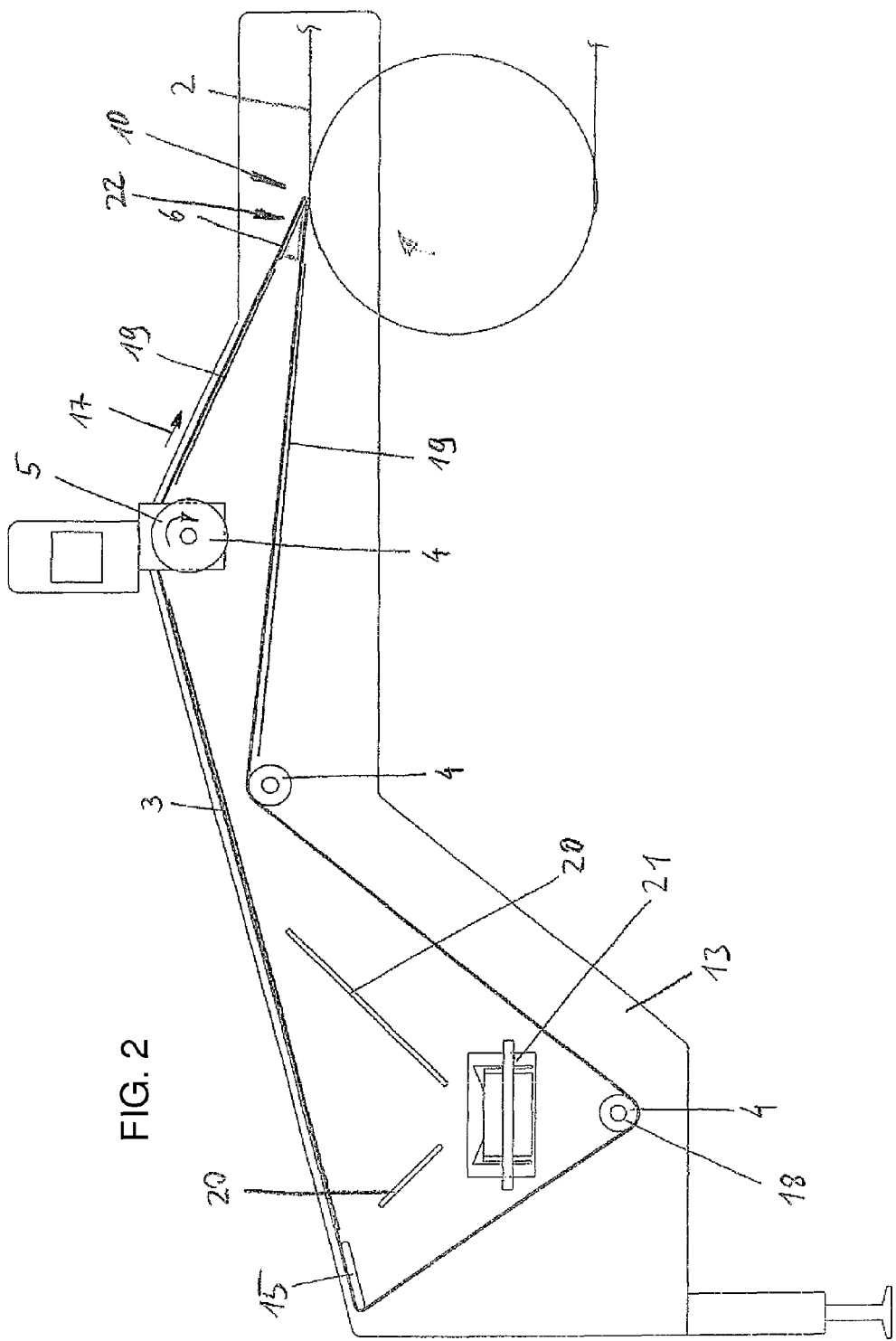
FIG. 2 shows another embodiment of an apparatus according to the invention in a schematic side view.

FIG. 2 shows another embodiment of an apparatus according to the invention which, apart from the configuration of the transfer body, substantially corresponds to FIG. 1. In the course of an endless conveyor belt 3, a plurality of deflection rollers 4 and a drive 5, a tensioning roller 18 and a transfer body 6 are provided. The conveyor belt is deflected in the transfer region 10 by the transfer body 6. In the present embodiment, the transfer body 6 is designed as a transfer blade. The transfer body thus has a sharp transfer edge with the result that the transfer contour 12 of the conveyor belt 3 also has a relative small transfer radius. In order to keep the transfer gap 16 as small as possible, the conveyor belt 3 must be guided as closely as possible to the transport surface 2. In order to avoid damage by heat, the conveyor belt 3 is designed as a discontinuous metal belt such as, for example, as a spiral link belt.

The transport surface 2 corresponds, for example, to the baking belt of a baking machine. During operation of the baking machine this is guided laterally with backlash so that the conveyor belt 3 must also be moved laterally for transfer of the shaped body 1 and/or the position of the transport surface must be adapted. During the lateral position of the conveyor belt 3 it is provided according to the invention that the transfer gap 16 remains constant. This subsequently means that the transfer contour 12 does not change position or only changes position to a small extent with respect to the transport surface 2.

To this end, the conveyor belt 3 is deformed by a parallel displacement in particular in the transfer region 10. In this case, the individual links of the spiral link chain are displaced laterally, preferably normally to the transport direction 17 relative to one another.

For deflection of the conveyor belt 3 around a transfer body 6 designed as a sharp transfer edge or as transfer blade, a special arrangement of the drive roller is required. Spiral link chains or other discontinuous metal belts which are suitable for being used in the present apparatus have a structure which does not allow a deflection around arbitrarily small deflection radii at elevated belt tension. In order to nevertheless effect a sharp transfer contour 12 and therefore a narrow transfer gap 16, according to the present invention the conveyor belt is substantially free from resistance stress in the run-in region 22 of the transfer contour 12. This means that in the run-in region 22 the tension of the conveyor belt 3 substantially corresponds to the basic tension of the conveyor belt. This basic tension can, for example, be zero, have positive values or in the case of a pushing region in the run-in region 22, have negative values. In generic apparatuses the conveyor belt has a basic tension which is substantially constant along the entire conveyor belt 3. When the belt is moving, the tension of the belt increases further at each element susceptible to friction in contact with the conveyor belt 3. The belt thus has the lowest tensile stress after the drive. In the region ahead of the drive, the belt has the greatest tensile stress. According to the embodiment of FIG. 2, the drive and/or the drive roller 5 is disposed in the region directly upstream of the transfer body 6. Directly upstream of the transfer body 6 means in this context that in the region between the drive roller 5 and the transfer body 6 the belt is substantially free from elements which increase the tensile stress of the conveyor belt 3. The guide means 19 in this case are not considered to be tensile-stress-increasing elements since the tensile stress produced by the friction is lower than that tensile stress which would be produced by a sagging caused by gravity.

As a result of the low tensile stress of the belt, in particular in the run-in region 22 and/or in the transfer region 10, the lateral displaceability of the conveyor belt 3 is also improved. In the case of a conveyor belt 3 designed as a spiral link belt, the drive rollers 5 comprise bodies engaging in the manner of a toothed wheel in free positions of the conveyor belt 3. Through rotation of this body or rollers, on the one hand the conveyor belt 3 is pulled in the direction of the drive roller 5 and on the other hand the conveyor belt 3 is pushed by the drive roller 5 in the direction of the transfer region.

The drive rollers 5 can in this case be laterally rigidly connected to the drive shaft of the drive. Thus, a lateral displacement of the conveyor belt 3 in the region of the drive roller 5 is prevented. During a displacement of the conveyor belt 3 in the transfer region 10 by the positioning apparatus 9, the displacement thus takes place principally in the region between the drive roller 5 and the transfer contour 12.

However, the drive rollers 5 can also be disposed displaceably on the drive shaft. In this case, the lateral position of the conveyor belt 3 can be varied by the positioning apparatus 9 also in the region of the drive and/or in the region of the drive roller 5.

However, according to the invention it is also advantageous if the lateral position of the conveyor belt 3 is kept constant in the receiving region 15.

Figure 3:
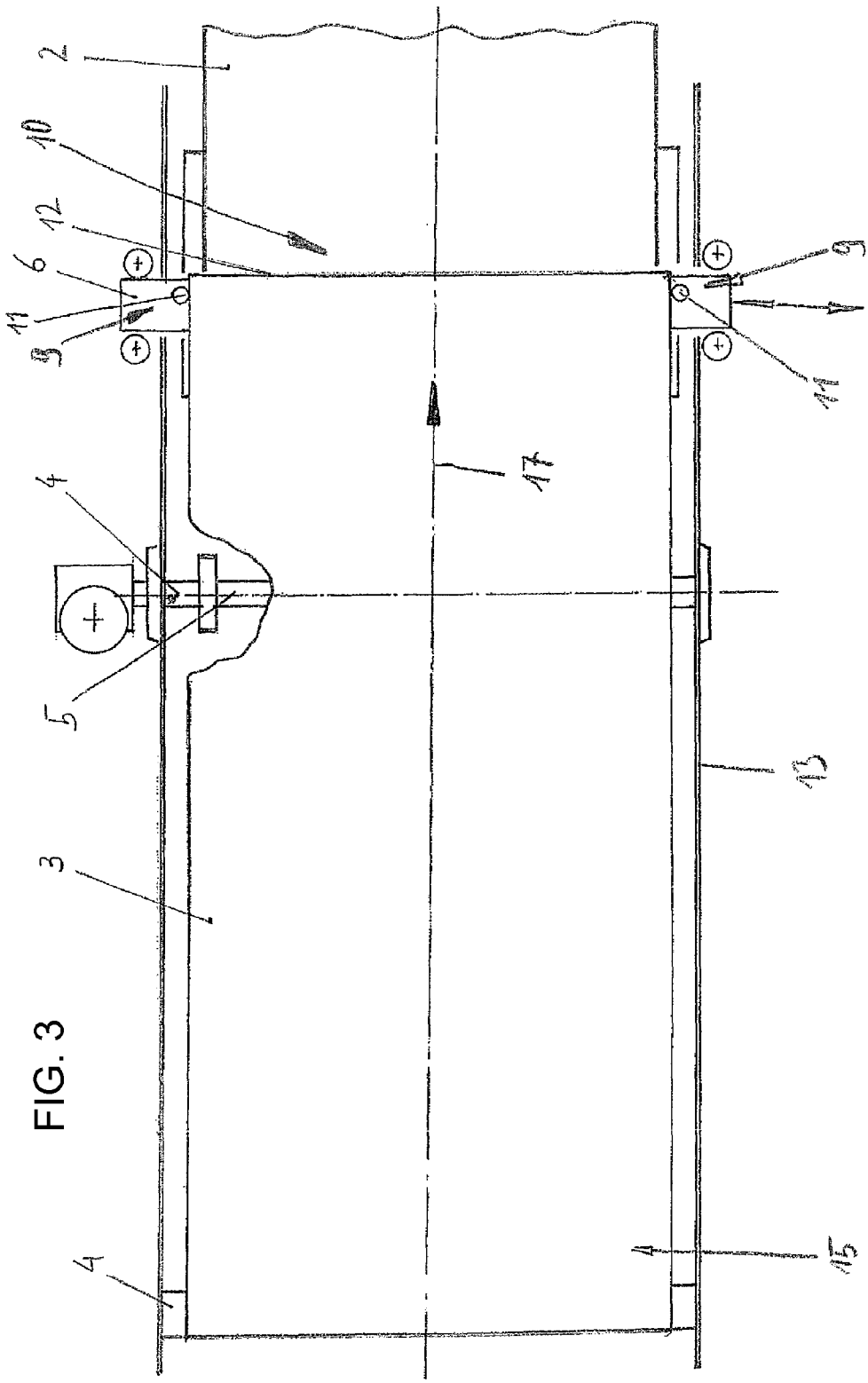
FIG. 3 shows a view from above of an apparatus according to the invention.

FIG. 3 shows a schematic view of an apparatus according to the invention viewed from above. In this case a conveyor belt 3 is guided around a plurality of deflecting rollers 4 and around a transfer body 6. Furthermore, the apparatus comprises a drive roller 5 by which means the conveyor belt 3 is driven in the transport direction 17. In the region of the transport surface 2, in particular in the transfer region 10, the conveyor belt 3 is guided around the transfer body 6 for transfer of the shaped body 1. The transfer contour 12 is formed by the deflection on the transfer body 6. Furthermore, the apparatus has a positioning apparatus 9 for positioning of the conveyor belt 3 with respect to the machine frame 13, with respect to the feeding region 15 and/or with respect to the transport surface 2. The positioning apparatus 9 is in particular adapted to displace the conveyor belt 3 laterally, to displace the conveyor belt 3 laterally in the transfer region 10 and/or to bring about a parallel displacement of the conveyor belt 3. To this end the positioning apparatus 9 has positioning means 11. The positioning means 11 are suitable for bringing about the lateral displacement of the conveyor belt 3. For example, roller bodies, roll bodies, pins or similar elements can be provided as positioning means 11. In particular, the positioning means 11 can be designed as elements which are suitable for guiding and/or positioning the conveyor belt 3. To this end, in the present embodiment two positioning means 11 are provided. These are provided in the transport direction 17 on both sides of the conveyor belt 3 and guide the conveyor belt along the transport direction. Furthermore the positioning means 11 can be moved by means of the positioning apparatus 9, in particular can be moved laterally, so that a lateral displacement of the conveyor belt 3 is brought about.

Figure 4:
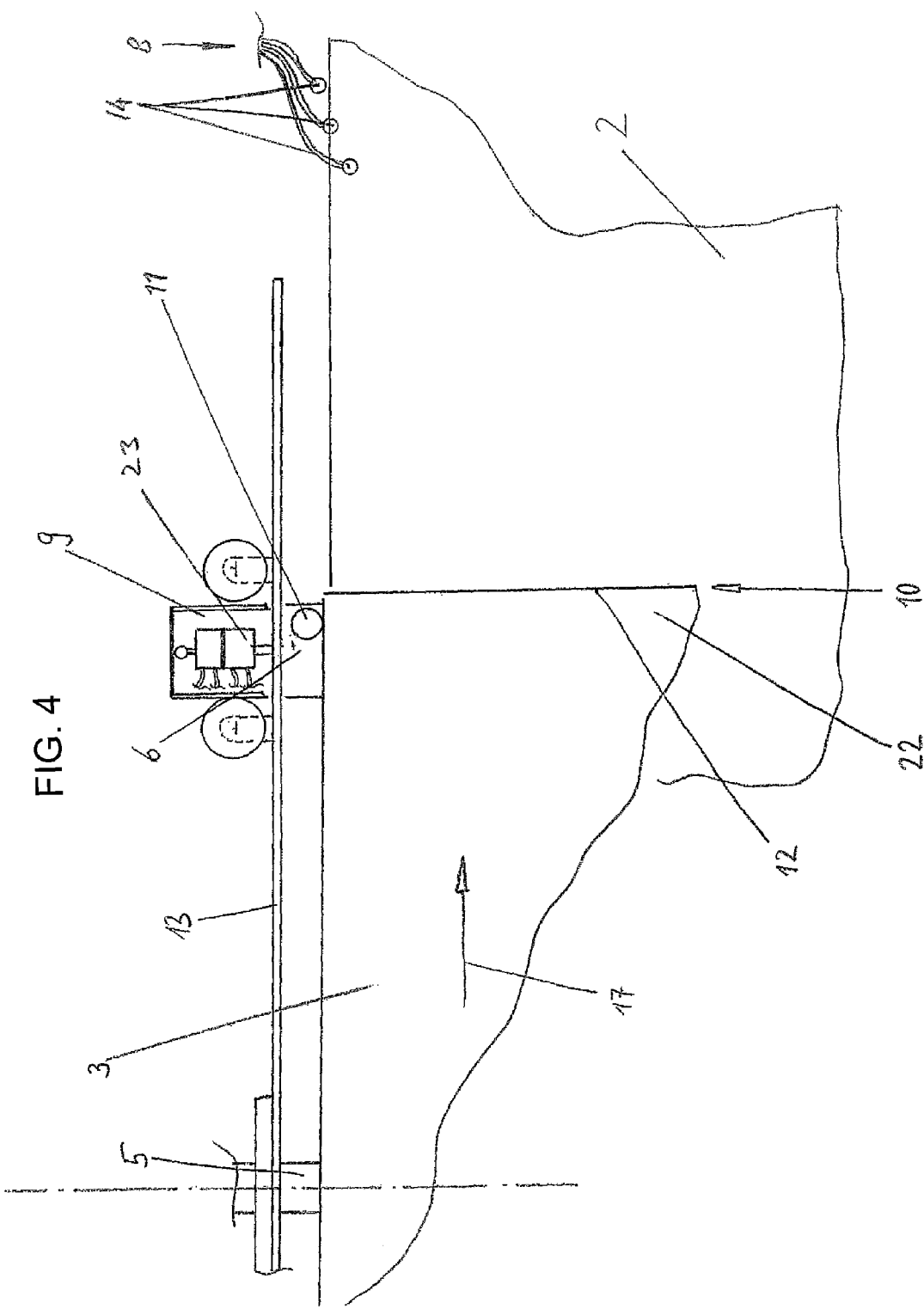
FIG. 4 shows a detail of an apparatus according to the invention in the transfer region.

FIG. 4 shows a schematic view of a detail of the positioning apparatus and the apparatus in the transfer region 10. The apparatus is located in a central, neutral position. The conveyor belt 3 is guided substantially straight along the transport direction 17 and not displaced.

The apparatus according to the invention comprises a detection apparatus 8 which comprises one or more detection means 14 for detection of the lateral position of the transport surface 2. The detection means can, for example, be designed as optical detection means such as, for example light curtains or laser measuring units, as electromechanical detection means such as, for example, microswitches or sensors and non-contact electrical sensors such as, for example, inductive sensors etc. The detection apparatus 8 and the detection means 14 are adapted to determine the lateral position of the transport surface 2 or at least to provide data which allow the positioning apparatus 9 to adapt the lateral positioning of the conveyor belt 3. For this purpose, for example, a control device can be provided. This gathers the sensor data or the data of the detection means 14 and controls or subsequently regulates the positioning apparatus 9 for the conveyor belt as a function of this data. The positioning apparatus comprises, for example, mechanical or electromechanical actuators 23 which are suitable for bringing about a movement of the conveyor belt 3. In the present embodiment the lateral displacement of the conveyor belt in the transfer region 10 is accomplished by lateral displacement of the positioning means 11. The positioning means 11 are connected or coupled to the transfer body 6. The actuators or the actuator act on the one hand on the machine frame 13 and on the other hand on the transfer body 6. The transfer body guided laterally in the machine frame can be displaced laterally by length variations of the actuator. The conveyor belt 3 is displaced laterally in the transfer region by means of the positioning means 11 guiding the conveyor belt 3. The movement of the actuator or the actuators is preferably dependent on the movement of the transport surface 2. The coupling is accomplished for example by means of the control device. Possible actuators 23 are, for example, linear axes, pneumatic axes, hydraulic axes, pneumatic or hydraulic cylinders, servo-actuators etc.

In the case of mechanical guides however, a purely mechanical coupling is also possible. In this case, the axial movement of the transfer body or of the conveyor belt can be accomplished by means of a rigid roller fastened on the left and on the right on the transfer body. These lateral guide rollers are placed laterally on the baking belt and are moved by the baking belt.

Figure 5:
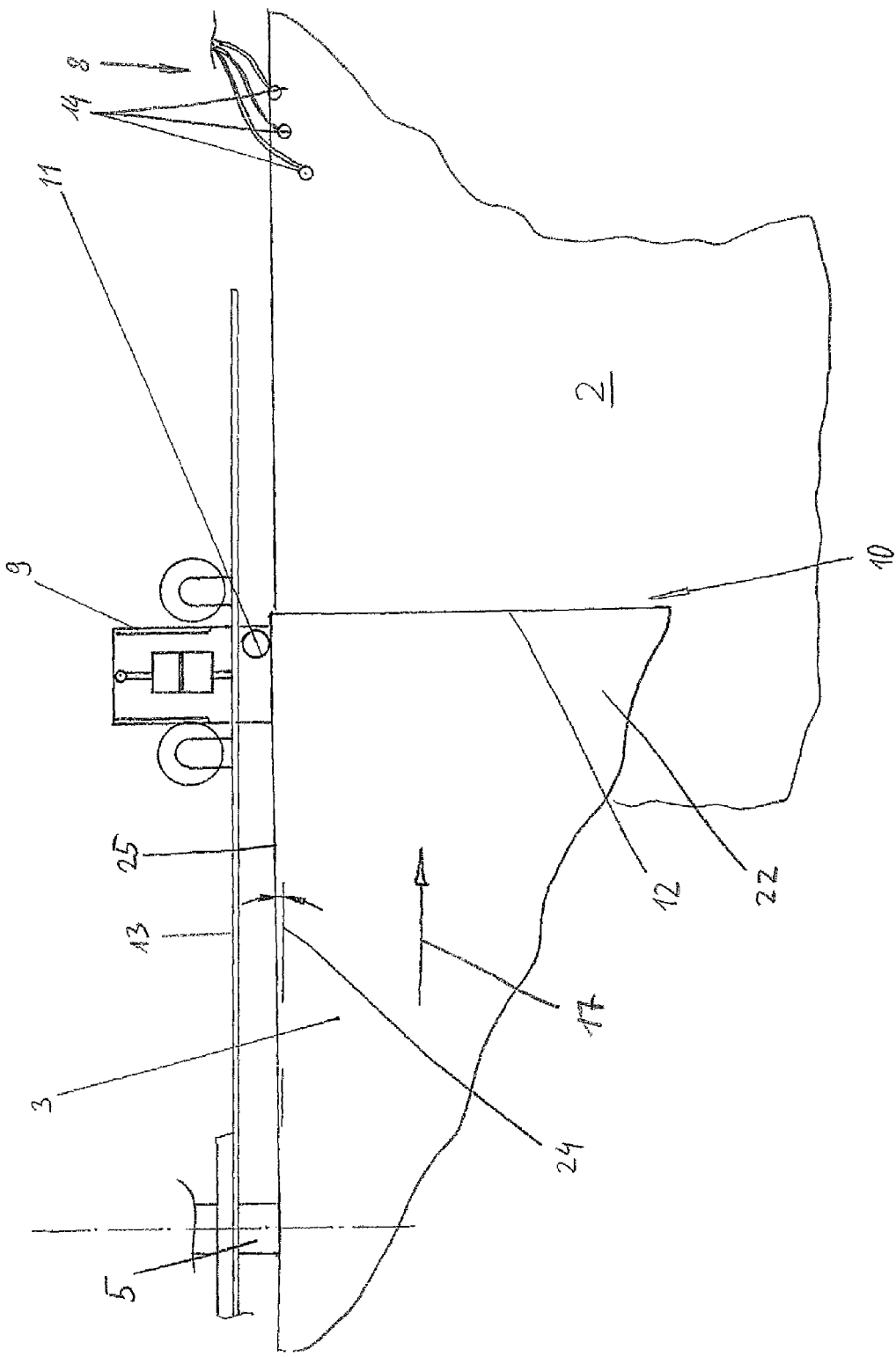
FIG. 5 shows a similar view to FIG. 4 but with laterally displaced conveyor belt.

FIG. 5 shows the same apparatus as FIG. 4 but with laterally displaced conveyor belt 3. The transport surface 2 is displaced laterally by a certain amount. The conveyor belt 3 is also displaced in the transfer region 10 by the same amount. To this end the lateral displacement of the transport surface 2 is detected by the detection apparatus 8 and the detection means 14. The lateral position of the conveyor belt 3 in the transfer region 10 is adapted to the lateral position of the transport surface 2 by means of a suitable controller. FIG. 5 shows schematically the straight position 24 from FIG. 4, in particular its one side edge. The offset position 25 differs from the course of the straight position 24 in order to bring about an adaptation to the lateral displacement of the transport surface 2. In the present embodiment the conveyor belt 3 is displaced between the drive roller 5 and the transfer region 10. This means that the transfer contour 12 of the conveyor belt 3 is laterally displaced relative to the transport direction 17. This displacement takes place preferably in or along that surface formed by the conveyor belt between the drive roller 5 and the transfer contour. In particular the conveyor belt 3 is displaced in the region of the transfer contour 12 along the transfer contour 12. Consequently, the transfer gap 16 between the transport surface 2 and the conveyor belt 3 is kept constant during the lateral displacement of the conveyor belt 3.

Figure 6:
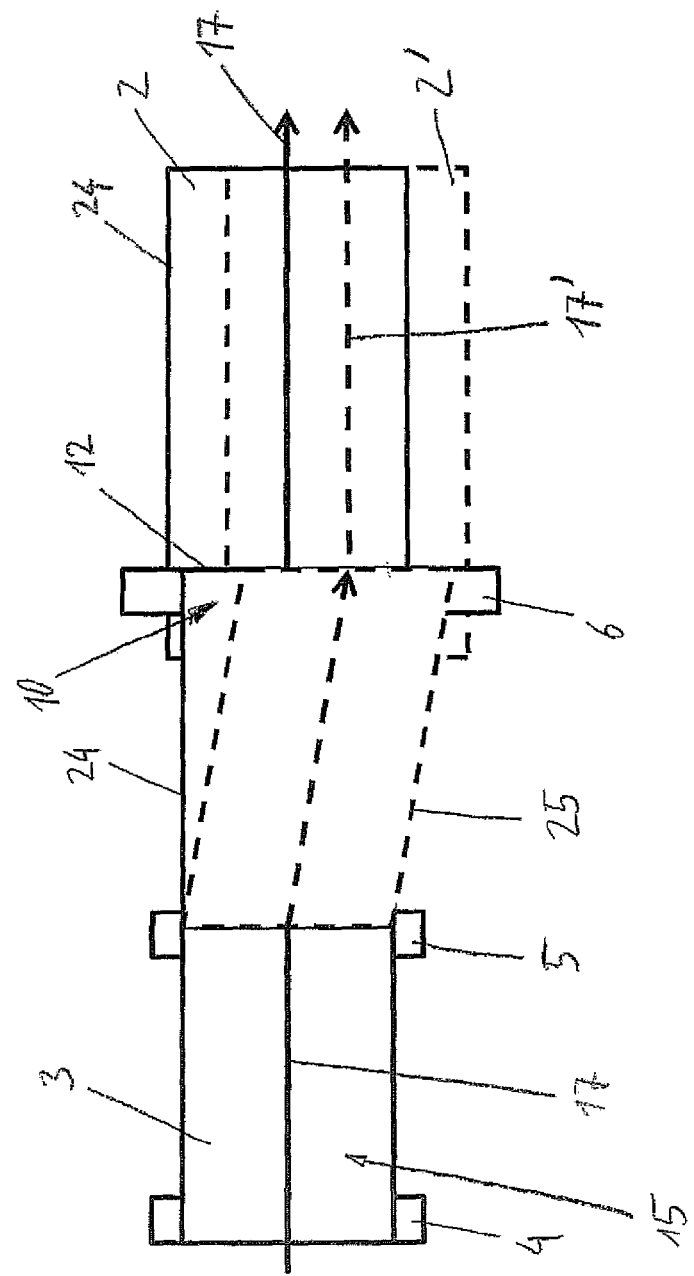
FIG. 6 shows a schematic view of the lateral displacement.

FIG. 6 shows a schematic view for further explanation of the lateral offset. To this end a conveyor belt 3 is again guided around a deflecting roller 4, a drive roller 5 and around a transfer body 6. The transfer contour 12 is defined following the transfer body 6. The conveyor belt 3 is indicated in two positions. The straight position 24 corresponds to a position in which the conveyor belt runs substantially rectilinearly in the transport direction. The offset position 25 is shown by dashed lines and corresponds to a position in which the transport surface 2 is displaced laterally from the normal position. The conveyor belt 3 is in particular laterally offset between the drive roller 5 and the transfer body 6 or the transfer contour 12. To this end the conveyor belt is displaced in the transfer region 10 substantially along the transfer contour 12. As a result of the displacement and the lateral offset, the conveyor belt 3 is positioned in the transfer region 10 above the transport surface 2. During the lateral change in position of the transport surface 2 to the offset position 2', the conveyor belt 3 is tracked according to the present invention. In the receiving region 15 on the other hand, the position of the conveyor belt 3 is kept constant. This means that both the transport direction 17 and also the lateral position of the conveyor belt 3 are kept constant. In straight position 24 the transport direction 17 runs substantially along a normal plane of the conveyor belt. In offset position 25 and with offset conveyor belt 3, the transport direction substantially follows the offset transport direction 17'.

The transfer region 10 can thus be tracked to the position of the transfer surface 2. This tracking is preferably accomplished continuously, in particular driven by an actuator 23.

The embodiments of FIGS. 1 to 6 are based on the same inventive idea. Alternatives such as shown for example by different embodiments of the transfer body in FIG. 1 and FIG. 2 in no way eliminate combination with constructions of other figures. Thus, for example, a combination of the embodiments of FIGS. 1, 3, 4, 5 and 6 is possible. Another combination of embodiments is the embodiment of FIG. 2 with the embodiments shown in FIGS. 3, 4, 5 and 6.

The embodiments of FIGS. 1 and 2 differ substantially through the different embodiment of the transfer body. Features and modes of action of FIG. 1 can accordingly be transferred to FIG. 2. Features and modes of action of FIG. 2 can also be transferred to the embodiment of FIG. 1.

Although the basis idea of the invention is not restricted to dimensions, exemplary dimensional information are given subsequently: the shaped bodies preferably correspond to non-rigid shaped bodies having a thickness of 1 mm to about 10 mm. The area of the shaped body in this case can be 1 to about 30 cm$^2$ and more. Depending on the size of the shaped body, the deflection radius of the transfer body is about 3 mm to several centimeters. However, the deflection radius is preferably less than 1 cm.

The method according to the invention is discussed further as follows: in one embodiment of the method, substantially non-rigid shaped bodies are conveyed from a rolling and a cutting device into the receiving region of the apparatus. The transfer to the conveyor belt of the apparatus according to the invention is accomplished, for example, by deflecting a conveyor belt around a sharp transfer edge. When the shaped body in the receiving region is transferred onto the conveyor belt of the apparatus, this is conveyed further in the transport direction. In this case, the shaped body according to the embodiments according to the invention of FIG. 1 and FIG. 2 passes the drive roller.

After the drive roller, the conveyor belt is at least substantially free from resistance tension according to FIG. 2. The shaped body is subsequently conveyed further in the direction of the transfer contour. In the transfer region the conveyor belt is guided around a transfer body. As a result of the deflection of the conveyor belt at the transfer body, the shaped body leaves the conveyor belt. The transfer contour is formed in that region in which the shaped body leaves the abutment against the conveyor belt. This can be designed linearly or correspond to a surface section.

A transfer gap is provided between the transfer contour and the transport surface onto which the shaped body is transferred. In the region of this gap the shaped body is neither supported by the transport surface nor by the conveyor belt and thus sags freely. In order to avoid any damage to the shaped body, the transfer gap should be designed to be as small as possible. Subsequently the shaped body is transferred to the transport surface. Preferably the transport surface is formed by a moving baking belt of a baking machine.

The baking belt of the baking machine is guided with backlash so that a lateral deviation occurs transversely to the transport direction.

In order to track the conveyor belt and the shaped body to the lateral position of the transport surface, the positioning apparatus according to the invention and the detection apparatus according to the invention are provided. The detection apparatus comprises one or more detection means for detection of the lateral position of the transport surface. The data of the detection apparatus or the lateral position of the transport surface are transmitted mechanically or electrically to a control device or directly to the positioning apparatus. The positioning apparatus comprises one or more actuators for lateral displacement of the conveyor belt in the transfer region. According to one embodiment the conveyor belt is laterally offset in the transfer region. At the same time however the conveyor belt is kept constant in the receiving region. Consequently the conveyor belt runs substantially rectilinearly and/or normally to the axes of the deflecting rollers between the receiving region and the drive roller. In the region between the drive roller and the transfer contour, the conveyor belt is dynamically laterally offset and tracked to the lateral position of the transport surface. As a result, the shaped bodies can always be placed on the desired position of the transport surface.

REFERENCE LIST

1. Shaped body
2. Transport surface/2' Offset position
3. Conveyor belt
4. Deflecting roller
5. Drive roller
6. Transfer body
7. Machine
8. Detection apparatus
9. Positioning apparatus
10. Transfer region
11. Positioning means
12. Transfer contour
13. Machine frame
14. Detection means
15. Receiving region
16. Transfer gap
17. Transport direction/17' Offset transport direction
18. Tensioning roller
19. Guide means
20. Funnel apparatus
21. Collector
22. Run-in region
23. Actuator
24. Straight position
25. Offset position

The invention claimed is:

1. An apparatus for transporting shaped bodies from a receiving region into a transfer region and for transferring the shaped bodies onto a transport surface, the apparatus comprising:
   at least one deflecting roller;
   a drive roller;
   a transfer body in the vicinity of the transport surface;
   a revolving driven conveyor belt guided over said at least one deflecting roller, over said drive roller and around said transfer body, said conveyor belt having a longitudinal extent;

a positioning apparatus configured to laterally displace said conveyor belt at least over a section of said longitudinal extent; and a detection apparatus configured to detect a lateral position of the transport surface and to permit at least one of a lateral displacement or positioning of said conveyor belt as a function of the lateral position of the transport surface;

said conveyor belt having a constant lateral position in the receiving region during said lateral displacement of said conveyor belt.

2. The apparatus according to claim 1, wherein the shaped bodies are substantially non-rigid, biscuit dough bodies and the transport surface is a heated baking belt of a baking machine.

3. The apparatus according to claim 1, wherein said conveyor belt has a constant transport direction in the receiving region during said lateral displacement of said conveyor belt.

4. The apparatus according to claim 1, wherein said conveyor belt is laterally displaceable in the transfer region.

5. The apparatus according to claim 1, which further comprises a transfer contour following said transfer body, said positioning apparatus being configured to laterally displace said conveyor belt along said transfer contour in the transfer region.

6. The apparatus according to claim 1, wherein said positioning apparatus includes at least one positioning device configured to guide said conveyor belt and an actuator configured to move said at least one positioning device.

7. The apparatus according to claim 6, wherein said at least one positioning device is coupled to said transfer body, and said transfer body is configured to be moved by an actuation of said actuator transversely to a transport direction of said conveyor belt.

8. The apparatus according to claim 6, wherein said at least one positioning device includes two positioning devices configured to laterally guide said conveyor belt.

9. The apparatus according to claim 6, wherein said actuator is a mechanical or an electromechanical actuator.

10. The apparatus according to claim 9, wherein said actuator is an electrically driven linear axle, a pneumatically driven linear axle, a hydraulically driven linear axle or a crank assembly.

11. The apparatus according to claim 1, wherein said detection apparatus includes a mechanical or electromechanical detection device.

12. The apparatus according to claim 11, wherein said detection device is a position sensor, an optical sensor, a microswitch, a reed sensor or a mechanically movable roll.

13. The apparatus according to claim 1, wherein said transfer body is constructed as a transfer blade.

14. The apparatus according to claim 13, wherein said transfer blade has a sharp transfer contour.

15. The apparatus according to claim 1, which further comprises a transfer contour following said transfer body, said conveyor belt having a transport direction, and said drive roller being disposed downstream of the receiving region and upstream of said transfer contour in said transport direction.

16. The apparatus according to claim 1, wherein the transport surface is part of a machine having a rigidly disposed machine frame, and said at least one deflecting roller, said drive roller and said transfer body are disposed or mounted in the machine frame.

17. The apparatus according to claim 1, wherein:
the transport surface is part of a machine having a machine frame;
said drive roller is coupled laterally rigidly to the machine frame;
said positioning apparatus includes a positioning device; and
at least one of said positioning device or said transfer body is movable laterally relative to the machine frame.

18. The apparatus according to claim 1, wherein said conveyor belt has a transport direction, and in the event of said lateral displacement of said conveyor belt, said transport direction in the receiving region differs from said transport direction in the transfer region.

19. The apparatus according to claim 1, which further comprises a transfer contour following said transfer body, said at least one deflecting roller, said drive roller and said transfer contour having axes being substantially parallel to one another.

20. The apparatus according to claim 1, which further comprises a transfer contour following said transfer body, said transfer contour having a run-in region, and said conveyor belt being a discontinuous belt substantially free from resistance stress in said run-in region.

21. The apparatus according to claim 20, wherein said discontinuous belt is a metal belt or a spiral link belt.

22. A biscuit baking oven, comprising an apparatus according to claim 1.

23. A method for transporting shaped bodies from a receiving region into a transfer region and for transferring the shaped bodies onto a transport surface, the method comprising the following steps:
A) conveying a shaped body on a revolving driven conveyor belt from the receiving region into the transfer region;
B) detecting a lateral position of the transport surface using a detection apparatus;
C) laterally displacing the conveyor belt as a function of the lateral position of the transport surface in the transfer region;
D) tracking the conveyor belt to the lateral position of the transport surface by laterally displacing the conveyor belt in the transfer region; and
E) transferring the shaped body onto the transport surface over a transfer contour and a transfer gap.

24. The method according to claim 23, wherein the shaped bodies are substantially non-rigid, biscuit dough bodies, and the transport surface is a heated baking belt of a baking machine.

25. The method according to claim 23, which further comprises keeping a lateral position and a transport direction of the conveyor belt constant in the receiving region.

* * * * *